(12) United States Patent
Ananthanarayanan et al.

(10) Patent No.: US 6,667,455 B2
(45) Date of Patent: Dec. 23, 2003

(54) DRAWN ARC WELDING METHOD AND DRAWN-ARC-WELD FERRULE

(75) Inventors: Venkatasubramanian Ananthanarayanan, Beavercreek, OH (US); Steven Paul Donahue, Fairborn, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/050,505

(22) Filed: Jan. 16, 2002

(65) Prior Publication Data

US 2003/0132203 A1 Jul. 17, 2003

(51) Int. Cl.7 .................................................. B23K 9/20
(52) U.S. Cl. ...................................................... 219/99
(58) Field of Search ....................... 219/98, 99; 16/108, 16/109

(56) References Cited

U.S. PATENT DOCUMENTS

| | | | | |
|---|---|---|---|---|
| 3,047,711 A | * | 7/1962 | Graham | 219/99 |
| 3,182,173 A | * | 5/1965 | Dash | 219/99 |
| 3,555,238 A | * | 1/1971 | Fay et al. | 219/98 |
| 3,557,339 A | * | 1/1971 | Rondeau | 219/99 |
| 3,597,573 A | * | 8/1971 | Ettinger | 219/99 |
| 4,117,297 A | * | 9/1978 | Sholle | 219/98 |
| 4,201,904 A | * | 5/1980 | Weidman | 219/98 |
| 4,306,137 A | * | 12/1981 | Shoup et al. | 219/99 |
| 4,317,020 A | * | 2/1982 | Shoup | 219/98 |
| 5,049,717 A | * | 9/1991 | Yoshida et al. | 219/98 |
| 5,135,154 A | * | 8/1992 | Yoshida et al. | 228/46 |
| 5,345,054 A | * | 9/1994 | Li | 219/98 |

* cited by examiner

*Primary Examiner*—M. Alexandra Elve
*Assistant Examiner*—Kevin P. Kerns
(74) *Attorney, Agent, or Firm*—Scott A. McBain

(57) ABSTRACT

A method for attaching parts together includes several steps. The parts are positioned for drawn arc welding the parts together. A drawn-arc-weld ferrule including metal is obtained. The ferrule is positioned for use in drawn-arc-welding together the positioned parts. The ferrule is cooled. The positioned parts are drawn arc welded together using the positioned ferrule. In a first expression of an embodiment, a drawn-arc-weld ferrule includes metal. In a second expression of an embodiment, a drawn-arc-weld ferrule includes separate segments each including metal.

15 Claims, 2 Drawing Sheets

DRAWN ARC WELDING METHOD AND DRAWN-ARC-WELD FERRULE

TECHNICAL FIELD

The present invention relates generally to welding methods and apparatus, and more particularly to a drawn arc welding method and a drawn-arc-weld ferrule.

BACKGROUND OF THE INVENTION

Conventional methods for attaching first and second parts together, such as a steel attachment ring and a steel rod of a vehicle shock absorber, include welding such as drawn arc welding. In one conventional drawn arc welding technique, the attachment ring is connected to a grounded drawn-arc-weld electrode, and the rod is connected to a positive drawn-arc-weld electrode. A tenon on the rod is brought in contact with the ring and is then withdrawn to create a welding arc which melts portions of the rod and the ring creating a weld puddle which leads to the welding together of the parts. A conventional ceramic ferrule is used to contain the weld puddle when the diameter of the tenon is larger than about six to eight millimeters or when a weldment dimension is larger than about ten millimeters when drawn arc welding is performed with or without one or both of the parts having a tenon. Conventional grooves in the ceramic ferrule allow gases created during welding to escape. Ceramic drawn arc weld ferrules are designed not to melt during welding.

After the weld is made, a conventional one-piece ceramic drawn-arc weld ferrule is broken up to be removed from the welded parts, and the broken ferrule pieces are then discarded. Conventional ceramic drawn-arc-weld ferrules are known which have been split in half creating two separate segments, wherein each segment is mounted to a ferrule holder. The ferrule holders are moved toward each other to bring the segments together to create the ferrule for surrounding the weld zone for drawn arc welding. The ferrule holders are moved away from each other after the parts have been welded together allowing removal of the welded parts from the welding machine. Such two-piece ceramic drawn-arc-weld ferrules are reusable for only a few hundred welds and are very expensive to machine or sinter to the necessary shapes. Conventional ferrule holders are known which contain passages for directing gases (such as a mixture of argon and carbon dioxide) to shield the weld zone and stabilize the welding arc.

What is needed is an improved drawn arc welding method and an improved drawn-arc-weld ferrule.

SUMMARY OF THE INVENTION

A first method of the invention is for attaching first and second parts together and includes steps a) through e). Step a) includes positioning the first and second parts for drawn arc welding the first and second parts together. Step b) includes obtaining a drawn-arc-weld ferrule comprising metal. The terminology "comprising metal" includes comprising a metal or comprising a plurality of metals. Step c) includes positioning the drawn-arc-weld ferrule for use in drawn-arc-welding together the positioned first and second parts. Step d) includes cooling the drawn-arc-weld ferrule. Step e) includes drawn arc welding the positioned first and second parts together using the positioned drawn-arc-weld ferrule.

A second method of the invention is for attaching first and second parts together and includes steps a) through e). Step a) includes positioning the first and second parts for drawn arc welding the first and second parts together. Step b) includes obtaining a drawn-arc-weld ferrule including separate segments each consisting essentially of metal or metal alloy or both, and each having a melting point lower than a maximum welding temperature reached during drawn arc welding together of the first and second parts. Step c) includes positioning together the segments to create a ferrule shape for use in drawn-arc-welding together the disposed first and second parts. Step d) includes cooling each of the segments. Step e) includes drawn arc welding the positioned first and second parts together using the positioned segments.

A first expression of an embodiment of the invention is for a drawn-arc-weld ferrule which includes metal.

A second expression of an embodiment of the invention is for a drawn-arc-weld ferrule including separate segments each including metal.

Several benefits and advantages are derived from one or more of the methods of the invention and/or from one or more of the expressions of an embodiment of the invention. Use of a drawn-arc-weld ferrule including metal, such as a copper ferrule, provides a drawn-arc-weld ferrule which is inexpensive to machine to the necessary shapes. In one example, cooling the ferrule will prevent the ferrule from melting from the heat generated by drawn arc welding and should allow the ferrule to be reused for several thousand times to drawn arc weld together parts such as steel attachment rings and steel rods of vehicle shock absorbers.

DESCRIPTION OF THE PREFERRED EMBODIMENTS

Figure 1:
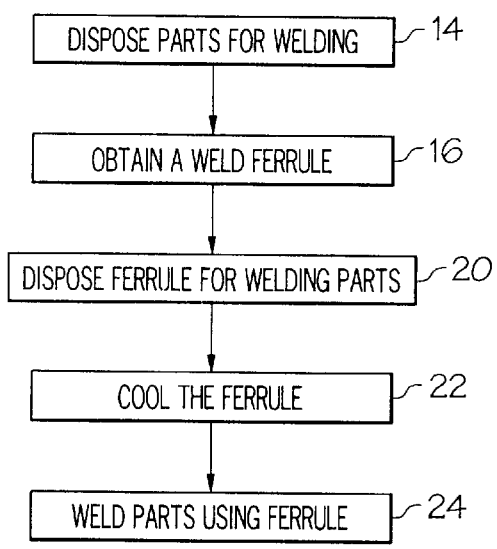
FIG. 1 is a flow chart of a first method of the invention.
Figures 2, 3:
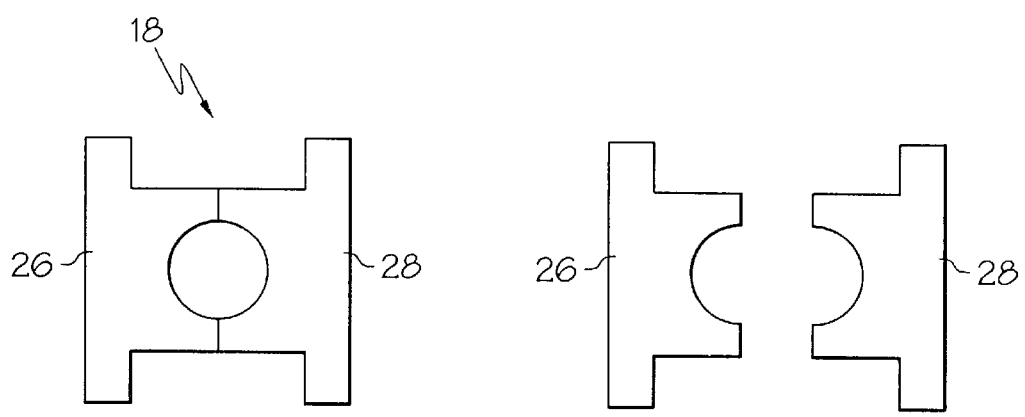
FIG. 2 is a schematic top planar view of a first embodiment of a drawn-arc-weld ferrule of the invention.
FIG. 3 is a view, as in FIG. 2, but with the two segments of the drawn-arc-weld ferrule shown separated.

Referring to FIGS. 1–4, wherein like numerals represent like elements throughout, a first method of the invention is for attaching first and second parts 10 and 12 (seen in FIG. 4) together and includes steps a) through e). Step a) is labeled as "Dispose Parts For Welding" in block 14 of FIG. 1. Step a) includes disposing the first and second parts 10 and 12 for drawn arc welding the first and second parts 10 and 12 together. Step b) is labeled as "Obtain A Weld Ferrule" in block 16 of FIG. 1. Step b) includes obtaining a drawn-arc-weld ferrule 18 comprising metal. It is noted that a metal alloy comprises metal. Step c) is labeled as "Dispose Ferrule For Welding Parts" in block 20 of FIG. 1. Step c) includes disposing the drawn-arc-weld ferrule 18 for use in drawn-arc-welding together the disposed first and second parts 10 and 12. Step d) is labeled as "Cool The Ferrule" in block 22 of FIG. 1. Step d) includes cooling the drawn-arc-weld ferrule 18. Step e) is labeled as "Weld Parts Using Ferrule" in block 24 of FIG. 1. Step e) includes drawn arc welding the disposed first and second parts 10 and 12 together using the disposed drawn-arc-weld ferrule 18.

It is noted that steps a) through e) can be performed in any appropriate order and that appropriate steps can be performed simultaneously. In one procedure, steps d) and e) are performed simultaneously. In the same or a different procedure, step b) is performed before step a). Other step arrangements are left to the artisan.

In one example of the first method, the drawn-arc-weld ferrule 18 would melt from the heat generated by the drawn arc welding of step e) without the cooling of step d). In the same or another example, the drawn-arc-weld ferrule 18 has a thermal conductivity at least equal to the thermal conductivity of copper. In a first construction, the drawn-arc-weld ferrule 18 consists essentially of one or more metals and/or one or more metal alloys. In one choice of materials, the drawn-arc-weld ferrule 18 comprises copper. In one modification, the drawn-arc-weld ferrule 18 consists essentially of copper. In one variation, the drawn-arc-weld ferrule 18 consists of copper.

In one design, the drawn-arc-weld ferrule 18 includes a plurality of separate segments 26 and 28, wherein the method also includes the step of attaching each of the segments 26 and 28 to a separate ferrule holder (not shown), and wherein step c) includes bringing the segments 26 and 28 together through movement of at least one of the ferrule holders. In one modification, the drawn-arc-weld ferrule 18 consists of two segments 26 and 28. The shape of the drawn-arc-weld ferrule 18 is left to the artisan to meet the needs of a particular weldment.

In one construction, each of the ferrule holders has a coolant passageway, wherein step d) includes passing coolant through the coolant passageway of each ferrule holder. In this construction, heat transfer is from the segment to the corresponding ferrule holder (which typically is made of the same material as the segment) to the coolant. In one variation, the coolant consists essentially of water. Other types of liquid coolant can be used. Techniques for cooling a ferrule holder without a coolant passageway include, without limitation, having the ferrule holder be in solid thermal conduction contact with the coldhead of a cryogenic refrigerator. Other coolant techniques, including gaseous cooling, for cooling the drawn-arc-weld ferrule 18 are left to the artisan.

In the same or a different construction, each of the segments 26 and 28 has a coolant passageway (not shown), and step d) includes passing coolant through the coolant passageway of each segment. In one variation, the coolant consists essentially of water.

Figure 4:
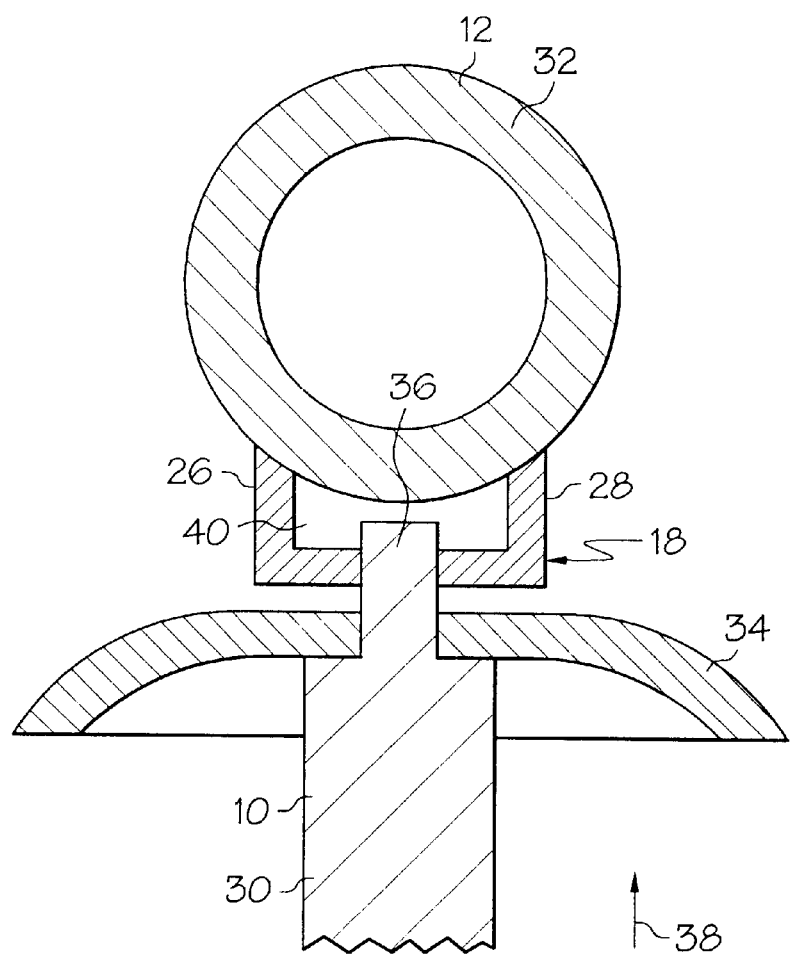
FIG. 4 is a schematic cross-sectional view of the drawn-arc-weld ferrule of FIGS. 2 and 3 positioned for drawn arc welding together first and second parts (in the form of an attachment ring and a rod of a vehicle shock absorber) wherein the ferrule holders (which are attached to the ferrule segments) and the electrical connections (which connect an electrical power source to the first and second parts) have been omitted for clarity.

In one application of the first method, the first and second parts 10 and 12 consist essentially of steel. In one example, the first part 10 is a rod 30 of a vehicle shock absorber, and the second part 12 is an attachment ring 32. In this example, a top cover plate 34 surrounds the tenon 36 of the rod 30 as shown in FIG. 4. It is noted that the tenon 36 is not required for drawn arc welding. Other examples of first and second parts 10 and 12 are left to the artisan. In one implementation of the first method, step a) includes moving the first part 10 (e.g., the rod 30) along a first direction 38 toward the second part 12 (e.g., the attachment ring 32), wherein step e) creates a weldment extending at least ten millimeters in a direction substantially transverse to the first direction 38. In one variation, the weldment has a substantially circular shape having a diameter of at least ten millimeters. It is noted that FIG. 4 is a pre-weld figure and does not show the weldment, but that such weldment would substantially fill the weld-puddle containment cavity 40 shown in FIG. 4. It also is noted that gas-outlet grooves in the segments 26 and 28 of the drawn-arc-weld ferrule 18 have been omitted from the figures for clarity, such grooves being well known to the artisan. It further is noted that the ferrule holders (not shown) can contain passages for directing gases (such as a mixture of argon and carbon dioxide) to shield the weld zone and stabilize the welding arc, as also is known to the artisan.

A second method of the invention (which can be described from the same FIG. 1 block diagram as the first method) is for attaching first and second parts 10 and 12 (seen in FIG. 4) together and includes steps a) through e). Step a) is labeled as "Dispose Parts For Welding" in block 14 of FIG. 1. Step a) includes disposing the first and second parts 10 and 12 for drawn arc welding the first and second parts 10 and 12 together. Step b) is labeled as "Obtain A Weld Ferrule" in block 16 of FIG. 1. Step b) includes obtaining a drawn-arc-weld ferrule 18 including a plurality of separate segments 26 and 28 each consisting essentially of metal or metal alloy or both, and each having a melting point lower than a maximum welding temperature reached during drawn arc welding together of the first and second parts 10 and 12. The terminology "consisting essentially of metal" includes consisting essentially of a metal or a plurality of metals. The terminology "consisting essentially of metal alloy" includes consisting essentially of a metal alloy or a plurality of metal alloys. Step c) is labeled as "Dispose Ferrule For Welding Parts" in block 20 of FIG. 1. Step c) includes disposing together the segments 26 and 28 to create a ferrule shape for use in drawn-arc-welding together the disposed first and second parts 10 and 12. Step d) is labeled as "Cool The Ferrule" in block 22 of FIG. 1. Step d) includes cooling each of the segments 26 and 28. Step e) is labeled as "Weld Parts Using Ferrule" in block 24 of FIG. 1. Step e) includes drawn arc welding the disposed first and second parts 10 and 12 together using the disposed segments 26 and 28. In one modification, each segment 26 and 28 consists essentially of copper. It is noted that the previous discussion of the first method is applicable to the second method.

A first expression of an embodiment of the invention is for a drawn-arc-weld ferrule 18 comprising metal. It is noted that a metal alloy comprises metal. A second expression of an embodiment of the invention is for a drawn-arc-weld ferrule 18 comprising a plurality of separate segments 26 and 28 each comprising metal. In one example, the drawn-arc-weld ferrule 18 has a thermal conductivity at least equal to the thermal conductivity of copper. In one modification, each segment 26 and 28 consists essentially of copper.

Several benefits and advantages are derived from one or more of the methods of the invention and/or from one or more of the expressions of an embodiment of the invention. Use of a drawn-arc-weld ferrule including metal, such as a copper ferrule, provides a drawn-arc-weld ferrule which is inexpensive to machine to the necessary shapes. In one example, cooling the ferrule will prevent the ferrule from melting from the heat generated by drawn arc welding and should allow the ferrule to be reused for several thousand times to drawn arc weld together parts such as steel attachment rings and steel rods of vehicle shock absorbers. It is noted that a copper ferrule has a much higher thermal shock resistance than a conventional ceramic ferrule.

The foregoing description of several methods of the invention and several expressions of an embodiment of the invention has been presented for purposes of illustration. It is not intended to be exhaustive or to limit the invention to the precise procedures or forms disclosed, and obviously many modifications and variations are possible in light of the above teaching. It is intended that the scope of the invention be defined by the claims appended hereto.

What is claimed is:

1. A method for attaching an attachment ring and a rod of a vehicle shock absorber having a top cover plate together comprising the steps of:
   a) disposing the top cover plate, the attachment ring and the rod for drawn arc welding attachment ring and the rod together with the top cover plate positioned between the attachment ring and the rod;
   b) obtaining a drawn-arc-weld ferrule comprising metal wherein the drawn-arc-weld ferrule includes a plurality of separate segments;
   c) disposing the drawn-arc-weld ferrule between the attachment ring and the top cover plate for use in drawn-arc-welding together the disposed attachment ring and the rod, wherein the outer diameter of the drawn-arc-weld ferrule is less than the outer diameter of the attachment ring and the outer diameter of the top cover plate;
   d) cooling the drawn-arc-weld ferrule; and
   e) drawn arc welding the disposed attachment ring and the rod together using the disposed drawn-arc-weld ferrule.

2. The method of claim 1, wherein the drawn-arc-weld ferrule would melt from the heat generated by the drawn arc welding of step e) without the cooling of step d).

3. The method of claim 1, wherein the drawn-arc-weld ferrule has a thermal conductivity at least equal to the thermal conductivity of copper.

4. The method of claim 1, wherein the drawn-arc-weld ferrule comprises copper.

5. The method of claim 4, wherein the drawn-arc-weld ferrule consists essentially of copper.

6. The method of claim 5, wherein the drawn-arc-weld ferrule consists of copper.

7. The method of claim 1, wherein the method also includes the step of attaching each of the segments to a separate ferrule holder, and wherein step c) includes bringing the segments together through movement of at least one of the ferrule holders.

8. The method of claim 7, wherein the drawn-arc-weld ferrule consists of two segments.

9. The method of claim 7, wherein each of the ferrule holders has a coolant passageway, and wherein step d) includes passing coolant through the coolant passageway of each ferrule holder.

10. The method of claim 9, wherein the coolant consists essentially of water.

11. The method of claim 7, wherein each of the segments has a coolant passageway, and wherein step d) includes passing coolant through the coolant passageway of each segment.

12. The method of claim 11, wherein the coolant consists essentially of water.

13. The method of claim 1, wherein the attachment ring and the rod essentially of steel.

14. The method of claim 1, wherein step a) includes moving the rod along a first direction toward the attachment ring, and wherein step e) creates a weldment extending at least ten millimeters in a direction substantially transverse to the first direction.

15. The method of claim 1, wherein the weldment has a substantially circular shape having a diameter of at least ten millimeters.

* * * * *